US011340071B2

(12) United States Patent
Sakano et al.

(10) Patent No.: US 11,340,071 B2
(45) Date of Patent: May 24, 2022

(54) CALIBRATION SYSTEM AND CALIBRATION APPARATUS

(71) Applicant: CLARION CO., LTD., Saitama (JP)

(72) Inventors: Morihiko Sakano, Tokyo (JP); Keiji Sato, Saitama (JP)

(73) Assignee: CLARION CO., LTD., Saitama (JP)

( * ) Notice: Subject to any disclaimer, the term of this patent is extended or adjusted under 35 U.S.C. 154(b) by 367 days.

(21) Appl. No.: 16/071,239

(22) PCT Filed: Nov. 22, 2016

(86) PCT No.: PCT/JP2016/084648
§ 371 (c)(1),
(2) Date: Jul. 19, 2018

(87) PCT Pub. No.: WO2017/138216
PCT Pub. Date: Aug. 17, 2017

(65) Prior Publication Data
US 2020/0271449 A1 Aug. 27, 2020

(30) Foreign Application Priority Data

Feb. 10, 2016 (JP) .............................. JP2016-023600

(51) Int. Cl.
*G01C 21/16* (2006.01)
*G05D 1/02* (2020.01)
*B60W 10/20* (2006.01)

(52) U.S. Cl.
CPC ........... *G01C 21/165* (2013.01); *B60W 10/20* (2013.01); *G05D 1/0214* (2013.01); *G05D 1/0246* (2013.01); *B60W 2420/42* (2013.01)

(58) Field of Classification Search
CPC . B60W 10/20; B60W 2420/42; G01C 21/165; G05D 1/0246; G05D 1/0214
See application file for complete search history.

(56) References Cited

U.S. PATENT DOCUMENTS 5,414,625 A * 5/1995 Hattori ................. G05D 1/0246
180/169
5,638,116 A * 6/1997 Shimoura ............. G05D 1/0246
348/118

(Continued)

FOREIGN PATENT DOCUMENTS

CN 108445877 A * 8/2018
JP 2009-253571 A 10/2009

(Continued)

OTHER PUBLICATIONS

CN-108445877-A translation (Year: 2018).*

(Continued)

*Primary Examiner* — Jeff A Burke
*Assistant Examiner* — Kyle T Johnson
(74) *Attorney, Agent, or Firm* — Foley & Lardner LLP

(57) ABSTRACT

A calibration system is mounted in a vehicle and is provided with: an attitude sensor that acquires attitude information regarding a vehicle coordinate system of the vehicle; an image pickup unit that captures an image of the surroundings of the vehicle; an attitude-sensor reliability level calculation unit that calculates an attitude-sensor reliability level that is a reliability level of the attitude sensor; and an attitude use estimation unit that estimates, in the case where the calculated attitude-sensor reliability level is greater than a predetermined threshold, an external parameter of the image pickup unit using the attitude information output by the attitude sensor and a relationship of a coordinate system of the image pickup unit to the vehicle coordinate system.

9 Claims, 8 Drawing Sheets

(56) References Cited

U.S. PATENT DOCUMENTS

| | | | | |
|---|---|---|---|---|
| 6,317,674 B1* | 11/2001 | Lohberg | ................ | B60T 8/172 |
| | | | | 303/113.2 |
| 9,280,824 B2* | 3/2016 | Fukuda | ................ | G08G 1/168 |
| 10,363,940 B2* | 7/2019 | Yamaguchi | ......... | B60W 40/105 |
| 2002/0042676 A1* | 4/2002 | Furusho | .............. | G06K 9/4609 |
| | | | | 701/300 |
| 2004/0105579 A1* | 6/2004 | Ishii | .......................... | B60R 1/00 |
| | | | | 382/154 |
| 2004/0199300 A1* | 10/2004 | Gustafsson | ........... | B60T 8/1706 |
| | | | | 701/1 |
| 2008/0192984 A1* | 8/2008 | Higuchi | ................ | G08G 1/166 |
| | | | | 382/104 |
| 2008/0317283 A1* | 12/2008 | Zhang | .................... | G01S 3/784 |
| | | | | 382/103 |
| 2009/0037059 A1* | 2/2009 | Huster | ................... | A01B 69/001 |
| | | | | 701/50 |
| 2012/0116676 A1* | 5/2012 | Basnayake | ............. | G01C 21/30 |
| | | | | 701/469 |
| 2012/0182426 A1* | 7/2012 | Fukuda | .................. | G08G 1/166 |
| | | | | 348/148 |
| 2012/0300072 A1* | 11/2012 | Kim | .......................... | B60R 1/00 |
| | | | | 348/148 |
| 2014/0139671 A1* | 5/2014 | Oh | ............................ | G06T 7/80 |
| | | | | 348/148 |
| 2014/0214364 A1* | 7/2014 | Handa | ................ | G01R 33/0023 |
| | | | | 702/182 |
| 2014/0327765 A1* | 11/2014 | Hsien | ................ | G06K 9/00798 |
| | | | | 348/143 |
| 2015/0015384 A1* | 1/2015 | Shima | ................. | B60W 30/095 |
| | | | | 340/435 |
| 2015/0279017 A1* | 10/2015 | Tamura | ................ | H04N 13/239 |
| | | | | 382/103 |
| 2015/0329048 A1* | 11/2015 | Wang | ...................... | B60R 1/00 |
| | | | | 348/148 |
| 2016/0040992 A1* | 2/2016 | Palella | ...................... | G01C 5/06 |
| | | | | 702/152 |
| 2017/0116487 A1* | 4/2017 | Yamazaki | ............ | H04N 13/271 |
| 2017/0123060 A1* | 5/2017 | Yamashita | ............... | H01Q 3/02 |
| 2017/0134661 A1* | 5/2017 | Chietein | ................... | B60R 1/00 |
| 2017/0270373 A1* | 9/2017 | Kawasaki | ............... | B60R 21/00 |
| 2017/0289447 A1* | 10/2017 | Nakao | ...................... | G06T 7/74 |
| 2017/0350721 A1* | 12/2017 | Ren | ........................ | G01C 23/00 |
| 2018/0025508 A1* | 1/2018 | Lee | ........................... | G06T 7/85 |
| | | | | 382/154 |
| 2018/0365859 A1* | 12/2018 | Oba | ..................... | B60W 40/114 |
| 2020/0125111 A1* | 4/2020 | Takizawa | ........... | G06K 9/00805 |
| 2020/0271449 A1* | 8/2020 | Sakano | ................. | B60W 10/20 |
| 2021/0179025 A1* | 6/2021 | Li | ........................... | G03B 17/08 |

FOREIGN PATENT DOCUMENTS

| | | |
|---|---|---|
| JP | 2013-222302 A | 10/2013 |
| JP | 5992184 B2 * | 9/2016 |
| KR | 2015-0051745 A | 5/2015 |
| WO | WO-2012/143036 A1 | 10/2012 |

OTHER PUBLICATIONS

JP-5992184-B2 translation (Year: 2016).*
International Search Report with English translation and Written Opinion issued in corresponding application No. PCT/JP2016/084648 dated Jan. 31, 2017.
Supplementary European Search Report issued in corresponding European Patent Application No. 16889917.7 dated Aug. 1, 2019.

* cited by examiner

CALIBRATION SYSTEM AND CALIBRATION APPARATUS

TECHNICAL FIELD

The present invention relates to a calibration system and a calibration apparatus.

BACKGROUND ART

In-vehicle camera has increasingly come into proliferation for the purpose of assisting a driver. The in-vehicle camera is mounted in a vehicle in the design-based position and attitude. However, there occurs inevitably a mounting error. When the image captured by the in-vehicle camera is used to perform distance calculation and the like, the mounting error may affect significantly the distance accuracy. Therefore, as a widespread practice, an error in mounting the in-vehicle camera is estimated in advance as an external parameter, and distance calculation is performed taking the external parameter of the camera into account.

The external parameter is calculated as described below, for example. That is, a predetermined test pattern is precisely placed in a decided position and captured by the in-vehicle camera. Then, the external parameter is calculated such that the captured image matches with an image captured by a camera manufactured and mounted according to designed values. However, the attitude of the vehicle changes depending on the increase and decrease in the number of passengers and the shift of a heavy object in the vehicle, and accordingly an installation state of the camera with respect to the ground changes. Accordingly, even when the external parameter is calculated at the time of shipment from the factory, the external parameter needs to be corrected later.

PTL 1 discloses the invention of calculating the external parameter using the image captured by the in-vehicle camera.

CITATION LIST

Patent Literature

PTL 1: WO 2012/143036 A

SUMMARY OF INVENTION

Technical Problem

According to the invention described in PTL 1, it is not possible to calculate the external parameter unless the image suited for calculation of the external parameter of the image pickup unit can be obtained.

Solution to Problem

According to a first aspect of the present invention, a calibration system is mounted in a vehicle and is provided with: an attitude sensor that acquires attitude information regarding a vehicle coordinate system of the vehicle; an image pickup unit that captures an image of the surroundings of the vehicle; an attitude-sensor reliability level calculation unit that calculates an attitude-sensor reliability level that is a reliability level of the attitude sensor; and an attitude use estimation unit that estimates, in the case where the calculated attitude-sensor reliability level is greater than a predetermined threshold, an external parameter of the image pickup unit using the attitude information output by the attitude sensor and a relationship of a coordinate system of the image pickup unit to the vehicle coordinate system.

According to a second aspect of the present invention, a calibration apparatus mounted in a vehicle and connected to an attitude sensor that acquires attitude information regarding a vehicle coordinate system of the vehicle and an image pickup unit that captures an image of the surroundings of the vehicle, is provided with: an attitude-sensor reliability level calculation unit that calculates an attitude-sensor reliability level that is a reliability level of the attitude sensor; and an attitude use estimation unit that estimates, in the case where the calculated attitude-sensor reliability level is greater than a predetermined threshold, an external parameter of the image pickup unit using the attitude information output by the attitude sensor and a relationship of a coordinate system of the image pickup unit to the vehicle coordinate system.

Advantageous Effects of Invention

According to the present invention, it is possible to calculate the external parameter even when no image suitable for calculation of the external parameter of the image pickup unit can be obtained.

DESCRIPTION OF EMBODIMENTS (Embodiment)

An embodiment of a calibration system will be described below with reference to FIGS. 1 to 8.

(Configuration)

Figure 1:
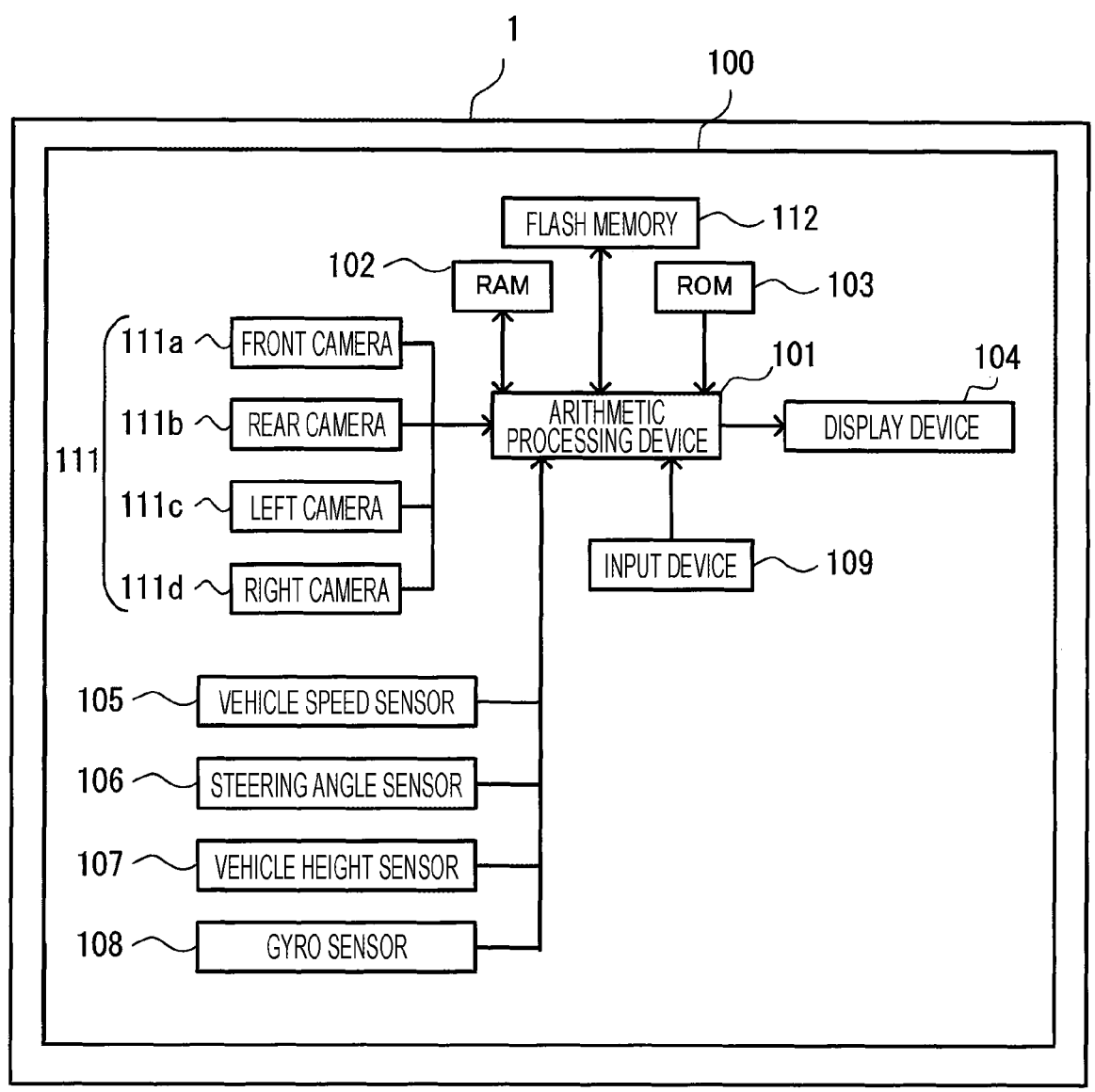
FIG. 1 is a diagram illustrating a configuration of a calibration system.

FIG. 1 is a diagram illustrating a configuration of a calibration system 100 according to the present invention. The calibration system 100 includes an image pickup unit 111, an arithmetic processing device 101, a RAM 102, a ROM 103, a display device 104, a vehicle speed sensor 105, a steering angle sensor 106, a vehicle height sensor 107, a gyro sensor 108, an input device 109, and a flash memory 112. The calibration system 100 is mounted in a vehicle 1.

The image pickup unit 111 is formed from a front camera 111a that captures an image of an area in front of the vehicle 1, a rear camera 111b that captures an image of an area in the rear of the vehicle 1, a left camera 111c that captures an image of an area on the left side of the vehicle 1, and a right camera 111d that captures an image of an area on the right side of the vehicle 1. Hereinafter, the front camera 111a, the rear camera 111b, the left camera 111c, and the right camera 111d will be collectively called cameras 111a to 111d. The mounting positions of the cameras 111a to 111d are as described below, for example. That is, the front camera 111a and the rear camera 111b are mounted near the license plates in the front and rear of the vehicle. The left camera 111*c* and the right camera 111*d* are mounted under the left and right side mirrors. In the embodiment, the cameras 111*a* to 111*d* are mounted in the production process of the vehicle 1, and the positions and attitudes of the cameras 111*a* to 111*d* to a vehicle coordinate system remain unchanged after the shipment from the factory.

The cameras 111*a* to 111*d* are mounted such that their optical axes are oriented in a downward direction at a predetermined angle with respect to a direction parallel to a horizontal plane. The cameras 111*a* to 111*d* are mounted in accordance with known design information, but there occurs inevitably a mounting error. The cameras 111*a* to 111*d* include wide-angle fish-eye lenses such that the images of the entire surrounding area of the vehicle 1 can be obtained by combining the four cameras' fields of view and that the four cameras' fields of view partially overlap. The fish-eye lens acquires a wide-angle image so that the obtained image is distorted based on a known distortion function. The images captured by the cameras 111*a* to 111*d* are transmitted to the arithmetic processing device 101. The camera parameters relating to the cameras 111*a* to 111*d* include internal parameters and external parameters. The internal parameters are saved in the ROM 103, and the external parameters are saved in the flash memory 112. The internal parameters are camera-specific information such as optical characteristics including focal length and lens distortion and the size of an image pickup element, which remains unchanged after the shipment from the factory. The external parameters are information relating to the mounting position and angle of the camera with respect to the ground, which may change depending on the attitude of the vehicle 1 even after the shipment from the factory where the positions and attitudes of the cameras 111*a* to 111*d* with respect to the vehicle 1 were fixed. Hereinafter, the external parameters of the cameras will be called "camera parameters" to differentiate from gyro correction information described later.

The arithmetic processing device 101 is a CPU that develops programs from the ROM 103 into the RAM 102 and executes the same there. These programs are executed mainly for distance calculation based on the images captured by the cameras 111*a* to 111*d*, creation of an overhead image, and calibration, that is, calculation of the camera parameters. The distance calculation based on the images captured by the cameras 111*a* to 111*d* is used for an obstacle avoidance function to avoid a collision with an obstacle and a parking assist function to assist in steering based on the distances from surrounding vehicles. The creation of an overhead image and the calibration will be described later. The arithmetic processing device 101 is connected to the cameras 111*a* to 111*d*, the vehicle speed sensor 105, the steering angle sensor 106, the vehicle height sensor 107, the gyro sensor 108, and the input device 109 via signal lines to receive various kinds of information and execute calculation processes based on the foregoing programs.

Written into the RAM 102 are numerical data necessary for arithmetic processing performed by the arithmetic processing device 101, the variables of the programs to the processing results in the course of the arithmetic processing, and others. The written data is read from the RAM 102 as necessary in the course of the arithmetic processing and is used in the arithmetic processing. The RAM 102 also stores the image data captured by the cameras 111*a* to 111*d*.

The ROM 103 stores, for example, programs for executing the calibration, invariable information necessary for the programs, and the internal parameters of the cameras 111*a* to 111*d*. The ROM 103 further stores programs for implementing the collision avoidance function and the parking assist function using the images captured by the cameras 111*a* to 111*d*.

The flash memory 112 is a non-volatile memory that stores the camera parameters of the cameras 111*a* to 111*d* and the gyro correction information of the gyro sensor 108. As described above, the camera parameters are changed after the shipment from the factory and are calculated through calibration by the arithmetic processing device 101. The gyro correction information of the gyro sensor 108 is also calculated by the arithmetic processing device 101.

The display device 104 is a liquid crystal display that provides the information received from the arithmetic processing device 101 to the user. For example, the display device 104 displays the overhead image created by the arithmetic processing device 101 based on the images captured by the cameras 111*a* to 111*d*. The display device 104 also switches the display contents in accordance with the output of the arithmetic processing device 101, such as switching to display of only an image of an area in the rear of the vehicle captured by the rear camera 111*b*.

The vehicle speed sensor 105, the steering angle sensor 106, the vehicle height sensor 107, and the gyro sensor 108 are respective sensors for observing the vehicle speed, the steering angle, the height of the vehicle 1 from the ground, and the triaxial angular velocity of the vehicle 1, which are used in the arithmetic processing performed by the arithmetic processing device 101.

The vehicle speed sensor 105 detects the running speed of the vehicle 1 and outputs the same to the arithmetic processing device 101. Based on the output of the vehicle speed sensor 105, the arithmetic processing device 101 determines whether the vehicle 1 is in a running state or a stopped state, for example.

The steering angle sensor 106 detects the steering angle of the vehicle 1 and outputs the same to the arithmetic processing device 101. Based on the output of the steering angle sensor 106, the arithmetic processing device 101 determines whether the vehicle 1 is traveling in a straight line or is cornering, for example.

The vehicle height sensor 107 detects the height of the vehicle 1 from the ground and outputs the same to the arithmetic processing device 101.

The gyro sensor 108 is a triaxial gyro sensor that outputs yaw angle, roll angle, and pitch angle (attitude information). The arithmetic processing device 101 can obtain attitude angle information at a specific time by accumulating the angular velocity output by the gyro sensor 108 at short-time intervals. The angular velocity output by the gyro sensor 108 includes an error. Thus the attitude angle information obtained based on the output of the gyro sensor 108 has a larger accumulated error with the passage of time. To eliminate the accumulated error, the gyro correction information described later is created and stored in the flash memory 112. Accordingly, taking the gyro correction information into account, the arithmetic processing device 101 can obtain the attitude angle information less under the influence of the accumulated error from the output of the gyro sensor 108. However, after the creation of the gyro correction information, error will be accumulated again.

The input device 109 includes switches and buttons to accept user operation and output the same to the arithmetic processing device 101. Based on the output of the input device 109, the arithmetic processing device 101 switches on or off the calibration function, initializes the calibration result, or the like, for example.

(Creation of an Overhead Image)

The arithmetic processing device 101 subjects the images input from the cameras 111a to 111d to viewpoint conversion/composition to create an image as seen from up above, that is, an overhead image, and outputs the same to the display device 104. The arithmetic processing device 101 creates the overhead image as described below, for example.

First, the arithmetic processing device 101 removes the distortion of the images input from the cameras 111a to 111d by using a known distortion function stored in advance in the ROM 103. Next, the arithmetic processing device 101 subjects the images cleared of distortion to viewpoint conversion/composition to obtain images seen from the overhead point of view, based on the camera parameters of the cameras 111a to 111d stored in the flash memory 112 and the known design values relating to camera mounting stored in advance in the ROM 103 or the like. This operation can be implemented by calculating specific pixels in the overhead image and corresponding specific pixels in the images from the cameras 111a to 111d, and assigning the luminance values of the specific pixels to the pixels of the overhead image, using a publicly known camera geometric transform equation. When the corresponding pixels include numbers with decimal points and no equivalent pixels are existent, a publicly known luminance interpolating process is performed to assign intermediate luminance values of peripheral pixels.

The arithmetic processing device 101 outputs the overhead image created by the foregoing process to the display device 104.

(Overview of the Calibration)

When the engine of the vehicle 1 is switched on, the arithmetic processing device 101 calculates the camera parameters of the cameras 111a to 111d and calculates the gyro correction information of the gyro sensor 108 as described below. The camera parameters of the cameras 111a to 111d and the gyro correction information of the gyro sensor 108 can be calculated before the shipment of the vehicle 1 from the factory, although this is not performed in the embodiment.

The overview of the calibration method will be provided below.

The features of the calibration is in that, even when the camera parameters of the images captured by the cameras 111a to 111d cannot be calculated, the camera parameters are calculated using the output of the gyro sensor 108.

The cameras 111a to 111d are mounted in the vehicle 1 as a rigid body, and the relative relationships of respective coordinate systems of the cameras 111a to 111d to the vehicle coordinate system remain constant after the shipment of the vehicle 1 from the factory. Therefore, once the relative relationships of the respective coordinate systems of the cameras 111a to 111d to the vehicle coordinate system are estimated, the camera parameters of the cameras 111a to 111d can be calculated using the output of the gyro sensor 108. The position and attitude relationships of the cameras 111a to 111d to the vehicle coordinate system can be estimated using the images captured by the cameras 111a to 111d.

However, the attitude angle information obtained by accumulating the output of the gyro sensor 108 has accumulated error, and thus the gyro correction information is calculated using the images captured by the cameras 111a to 111d.

(Calibration Processing)

The calibration processing, that is, the calculation of the camera parameters of the cameras 111a to 111d and the calculation of the gyro correction information of the gyro sensor 108 will be described with reference to the flowcharts of FIGS. 2 to 8. The flowcharts of FIGS. 3 to 8 are derived from the main flowchart of FIG. 2. The processes described below with reference to the flowcharts of FIGS. 2 to 8 are mainly performed by the arithmetic processing device 101.

(Main Flowchart)

Figure 2:
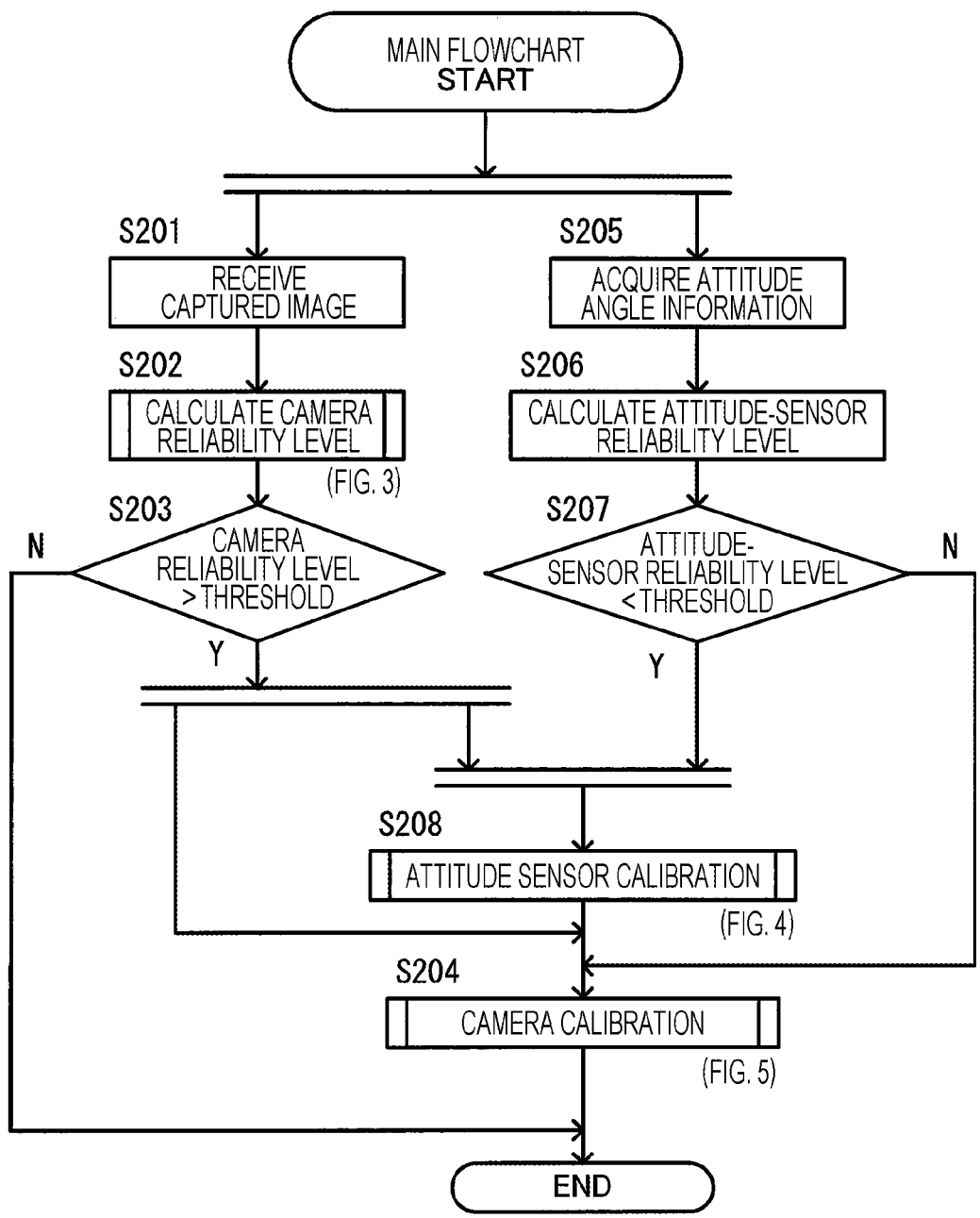
FIG. 2 is a main flowchart.

FIG. 2 is a main flowchart of the calibration processing. This processing is repeatedly executed while the ignition switch of the vehicle 1 is on.

When starting the processing described in the main flowchart, the arithmetic processing device 101 executes steps S201 and S205 in parallel.

In step S201, the arithmetic processing device 101 receives the captured images from the cameras 111a to 111d, and moves to step S202.

In step S202, the arithmetic processing device 101 uses the captured images received in step S201 to calculate respective camera reliability levels of the cameras 111a to 111d. The camera reliability level is an index for acquiring the feature amount necessary for image processing from the image captured by a camera. The image processing here refers to image processing in attitude sensor calibration in step S208 and image processing in camera calibration in step S204. The calculation of the camera reliability level will be described later with reference to FIG. 3. Upon completion of the calculation of the camera reliability level, the arithmetic processing device 101 moves to step S203.

In step S203, when determining that all the four camera reliability levels calculated in step S202 exceed a predetermined threshold, the arithmetic processing device 101 moves to steps S208 and S204. When determining that any one of the four camera reliability levels calculated in step S202 is equal to or less than the predetermined threshold, the arithmetic processing device 101 terminates the program under which operations are described in FIG. 2.

In step S205 executed in parallel with step S201, the arithmetic processing device 101 acquires the attitude angle information regarding the vehicle 1 based on the output of the gyro sensor 108, and then moves to step S206.

In step S206, the arithmetic processing device 101 calculates the attitude-sensor reliability level. As described above, error is accumulated with the lapse of time in the calculation of the attitude angle information based on the output of the gyro sensor 108. The accumulated error can be reduced temporarily by creating the gyro correction information, but afterward, the error increases with the lapse of time. This property is represented as an attitude-sensor reliability level. That is, the arithmetic processing device 101 sets an attitude-sensor reliability level function to take on the maximum value immediately after the creation of the gyro correction information and then attenuate linearly with the lapse of time. The inclination of the attitude-sensor reliability level function will be called attenuation rate. The attenuation rate is set to a predetermined value in the initial state. The setting of the attenuation rate based on actual measurement will be described later. The arithmetic processing device 101 calculates the attitude-sensor reliability level based on the attitude-sensor reliability level function and the time elapsed from the creation of the gyro correction information, and then moves to step S207.

In step S207, the arithmetic processing device 101 determines whether the attitude-sensor reliability level calculated in step S206 is smaller than a predetermined threshold. When determining that the attitude-sensor reliability level is smaller than the threshold, the arithmetic processing device 101 moves to step S208. When determining that the attitude-sensor reliability level is equal to or greater than the threshold, the arithmetic processing device 101 moves to step S204.

When making the affirmative determination in step S203 and making the affirmative determination in step S207, the arithmetic processing device 101 executes step S208. In other words, the attitude-sensor reliability level is equal to or less than the threshold, and thus the calibration of the gyro sensor 108 is necessary. In addition, the camera reliability level exceeds the threshold, and thus the arithmetic processing device 101 executes step S208 when the calibration of the gyro sensor 108 is possible. In step S208, the arithmetic processing device 101 performs the calibration of the gyro sensor 108, that is, the creation of the gyro correction information using the captured images. As described above, the attitude-sensor reliability level takes on the maximum value immediately after the creation of the gyro correction information, and then attenuates linearly with the lapse of time. Accordingly, the attitude-sensor reliability level temporarily increases when the gyro sensor 108 is calibrated. This step will be described later in detail with reference to FIG. 4. After the calibration of the attitude sensor in step S208, the arithmetic processing device 101 moves to step S204. However, if the calibration of the attitude sensor is not possible due to insufficient amount of accumulated data, the arithmetic processing device 101 terminates the program under which the operations are described in FIG. 2 without executing step S204.

The arithmetic processing device 101 executes step S204 when making the affirmative determination in step S203 or making the negative determination in step S207, or when a predetermined condition is satisfied in step S208. In other words, the arithmetic processing device 101 executes step S204 when at least one of the camera reliability level and the attitude-sensor reliability level exceeds the threshold. In step S204, the arithmetic processing device 101 selects the method for calculating the camera parameters in accordance with the camera reliability level and the attitude-sensor reliability level, and calculates the camera parameters. This step will be described later in detail with reference to FIG. 5. Upon completion of this step, the arithmetic processing device 101 terminates the program under which the operations are described in FIG. 2.

(Camera Reliability Level)

Figure 3:
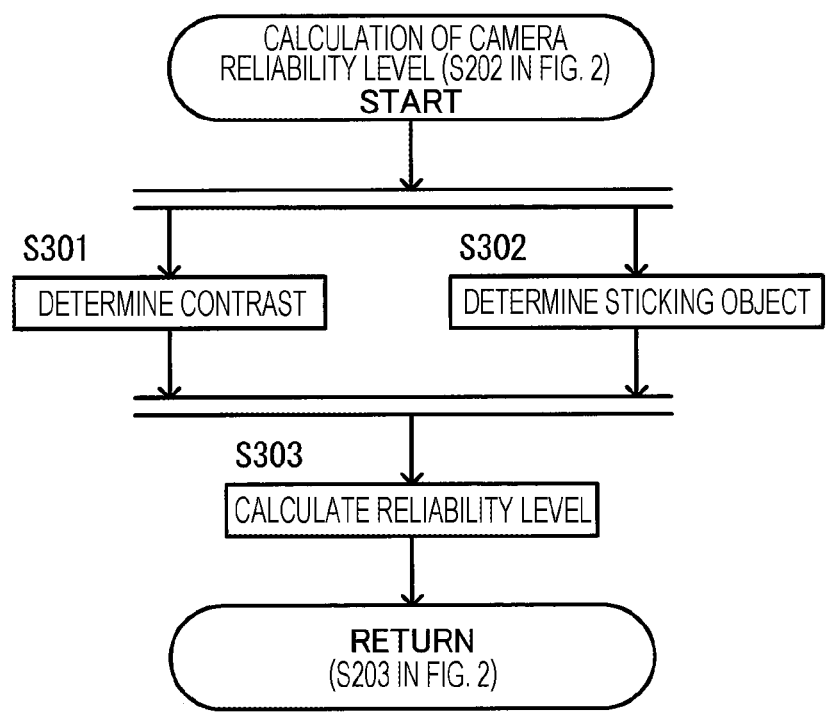
FIG. 3 is a flowchart of a camera reliability level calculation process.

FIG. 3 is a flowchart describing the details of the camera reliability level calculation performed in step S202 of FIG. 2.

When starting the camera reliability level calculation, the arithmetic processing device 101 executes steps S301 and S302 in parallel.

In step S301, the arithmetic processing device 101 determines the contrasts, that is, evaluates the magnitudes of luminance contrasts of the images captured by the cameras 111a to 111d. For example, in evaluation of the contrast, the arithmetic processing device 101 extracts the edges of the images captured by the cameras 111a to 111d using a publicly known Sobel filter or the like, and calculates the respective evaluation values of the cameras 111a to 111d according to the number of pixels with edge strengths equal to or higher than a predetermined threshold. The evaluation value becomes greater with a higher contrast as a larger number of pixels with edge strengths equal to or larger than the threshold are extracted. For example, the evaluation value is an integer of 0 to 100.

In step S302 executed in parallel with step S301, the arithmetic processing device 101 determines the presence or absence of a sticking object on the cameras 111a to 111d, that is, determines the presence or absence of a shielding object on the image pickup plane and evaluates the size of a shielded area of the image pickup plane. The shielded area of the image pickup plane is the area of the image pickup plane where light from a subject does not reach due to water drops or mud on the lens, for example. The maximum evaluation value is output without a shielding object, and the smaller evaluation value is output with a larger shielded area. The arithmetic processing device 101 evaluates differences between the images captured at different times, that is, time-series variations in the captured images as described below. That is, the arithmetic processing device 101 determines the area that has smaller luminance differences than a predetermined threshold and continues to exist for a predetermined period of time or more as a shielded area, and calculates a smaller evaluation value with a larger proportion of the shielded area in the captured image. For example, the evaluation value is an integer of 0 to 100.

In step S303 executed after completion of steps S301 and S302, the arithmetic processing device 101 calculates the reliability levels based on the evaluation values of the cameras 111a to 111d calculated in steps S301 and S302. The evaluation value suitable for image processing becomes large, and thus the reliability level increases with a greater evaluation value. The reliability level is an integer of 0 to 100, for example, which is calculated as an average or square root of product of the evaluation values output in steps S301 and S302.

The arithmetic processing device 101 calculates the reliability levels of the cameras 111a to 111d by the foregoing process, and terminates the process described in the flowchart of FIG. 3 and returns to step S203 of FIG. 2.

(Attitude Sensor Calibration)

Figure 4:
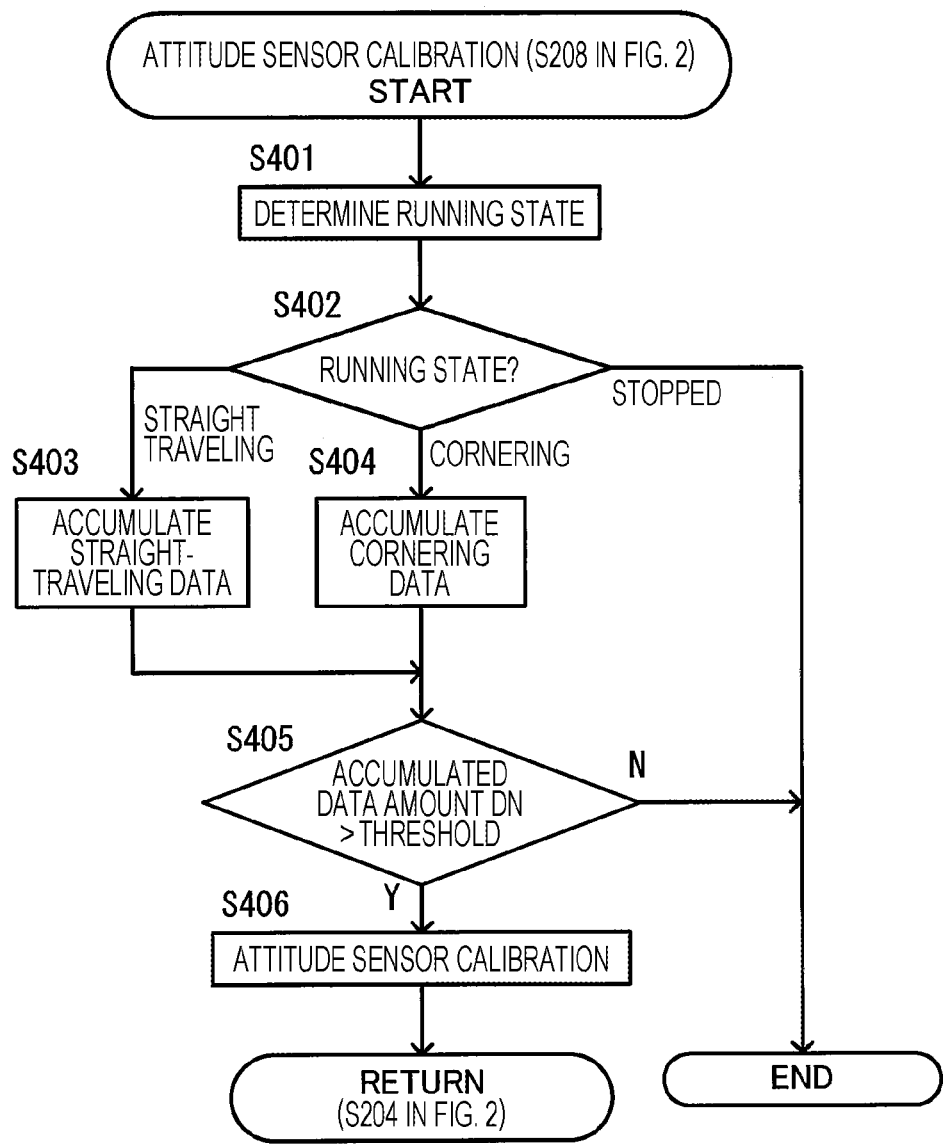
FIG. 4 is a flowchart of an attitude sensor calibration process.

FIG. 4 is a flowchart describing the details of the attitude sensor calibration performed in step S208 of FIG. 2.

In step S401, the arithmetic processing device 101 determines whether the vehicle 1 is traveling in a straight line, cornering, or stopped. The arithmetic processing device 101 acquires the outputs of the vehicle speed sensor 105, the steering angle sensor 106, and the gyro sensor 108, and calculates the behavior of the vehicle 1 for the latest time, for example, the past several seconds to determine the running state of the vehicle 1. When the speed of the vehicle 1 is equal to or less than a predetermined speed, the arithmetic processing device 101 determines that the vehicle 1 is stopped. When the orientation of the vehicle 1, that is, a change in the yaw angle is smaller than a preset threshold and the steering angle is smaller than a preset threshold, the arithmetic processing device 101 determines that the vehicle 1 is traveling in a straight line. When the orientation of the vehicle is greater than a threshold different from the threshold for determining that the vehicle is traveling in a straight line and the steering angle is greater than a threshold different from the threshold for determining that the vehicle is traveling in a straight line, the arithmetic processing device 101 determines that the vehicle is cornering. Then, the arithmetic processing device 101 moves to step S402.

In step S402, the arithmetic processing device 101 evaluates the running state determined in step S401. When determining that the vehicle is traveling in a straight line, the arithmetic processing device 101 moves to step S403. When determining that the vehicle is cornering, the arithmetic processing device 101 moves to step S404. When determining that the vehicle is stopped or in another state, the arithmetic processing device 101 terminates the process described in the flowchart of FIG. 4.

In step S403, the arithmetic processing device 101 saves the images captured by the cameras 111a to 111d and the output of the gyro sensor 108 as straight-traveling data in the RAM 102, and then moves to step S405.

In step S404, the arithmetic processing device 101 saves the images captured by the cameras 111a to 111d and the output of the gyro sensor 108 as cornering data in the RAM 102, and then moves to step S405.

In step S405, the arithmetic processing device 101 determines whether the number of straight-traveling data saved in the RAM 102 is greater than a threshold and the number of cornering data saved in the RAM 102 is greater than a threshold. When determining that both the numbers of data (DN) are greater than the thresholds, the arithmetic processing device 101 moves to step S406. When determining that any one of the numbers of data (DN) is equal to or less than the threshold, the arithmetic processing device 101 terminates the process described in the flowchart of FIG. 4. The threshold for the straight-traveling data and the threshold for the cornering data may be identical or different.

In step S406, the arithmetic processing device 101 performs the attitude sensor calibration, that is, the calculation of the gyro correction information by using the straight-traveling data and the cornering data saved in the RAM 102. The arithmetic processing device 101 uses the straight-traveling data to correct the pitch axis, and uses the cornering data to correct the yaw axis. Correcting the two axes to the vehicle coordinate system makes it possible to implement the calibration between the vehicle 1 and the gyro sensor 108.

The attitude sensor calibration is performed as described below. First, two or more straight structures parallel to the traveling direction, such as parallel white lines or curb stones are recognized and extracted at the same time in the image data included in the straight-traveling data. The method for recognizing the straight structures is not limited to a specific method but may be publicly known Hough transformation or the like, for example. Using the parallelism of the straight structures makes it possible to estimate instantaneous pitch angle fluctuation in the vehicle 1. A rotation matrix is determined such that there is a match between the estimated pitch angle fluctuation and the pitch angle fluctuation amount output from the gyro sensor 108. In this case, the matching rotation matrix is not uniquely determined by only uniaxial information, and thus the correction is made such that there is also a match in the yaw angle information. The yaw angle information is acquired from the cornering data. Corner feature points are tracked in the image data included in the cornering data, and the yaw angle fluctuation amount of the vehicle 1 is determined from the tracked path. The corner feature points are detected using a Harris corner detector. The feature points are tracked using sum of absolute difference (SAD), sum of squared difference (SSD), or the like. A rotation matrix is estimated such that there is a match between the yaw angle fluctuation amount of the vehicle 1 and the corresponding yaw angle data obtained from the gyro sensor 108. That is, a rotation matrix is determined such that there is a match between the pitch angle fluctuation and the yaw angle fluctuation of the vehicle 1 obtained from the image and the two axes of the gyro sensor 108. Matching the two axes automatically leads to matching in the one remaining axis, that is, the roll angle. The rotation matrix is estimated using a publicly known optimization method. At the same time, the current angle value output from the attitude sensor is corrected to the angle obtained from the image to reset the accumulated error of the attitude sensor. The thus calculated rotation matrixes and the angles obtained from the image constitute the gyro correction information. Then, the arithmetic processing device 101 terminates the process described in the flowchart of FIG. 4.

(Camera Calibration)

Figure 5:
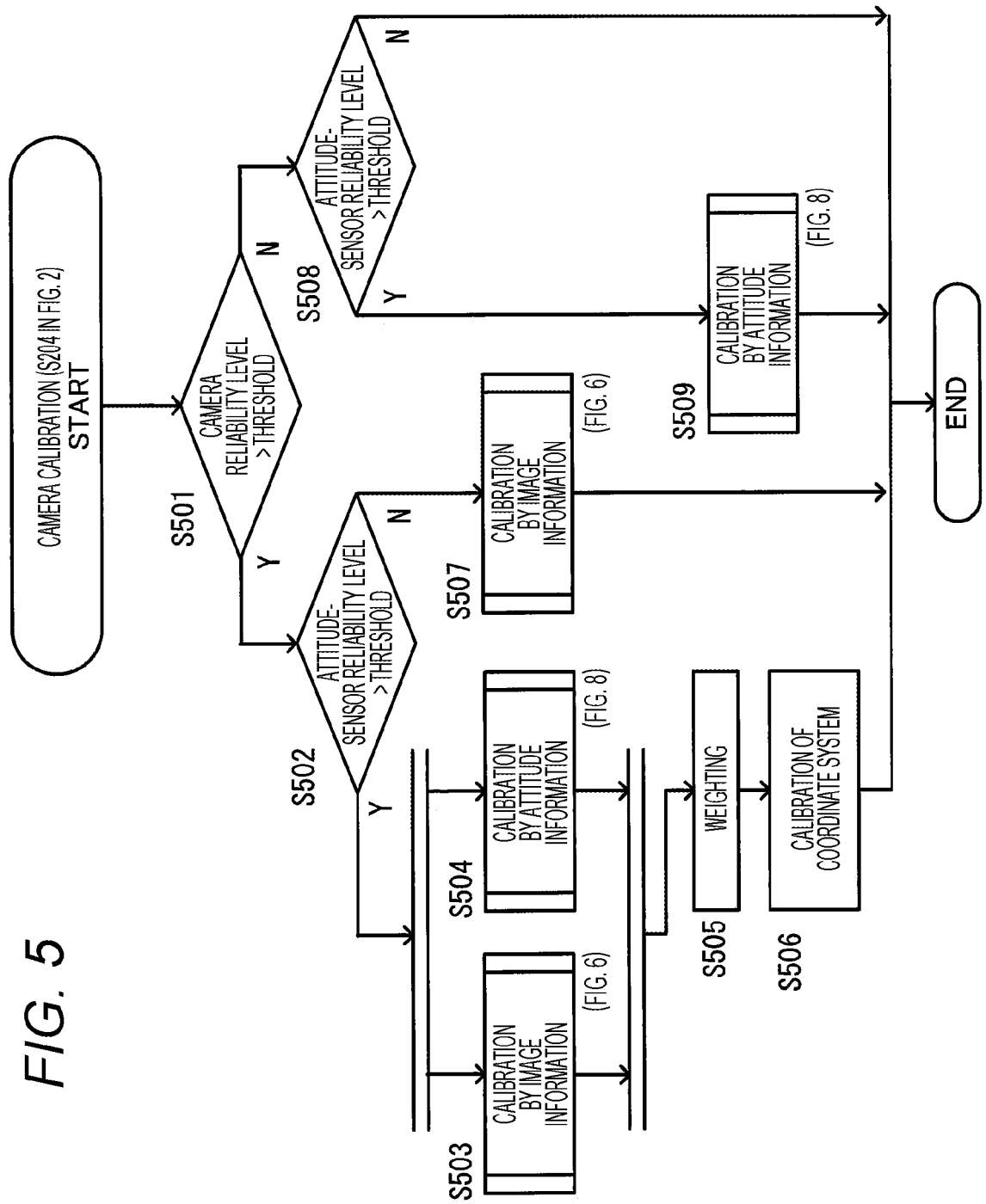
FIG. 5 is a flowchart of a camera calibration process.

FIG. 5 is a flowchart describing the details of the camera calibration performed in step S204 of FIG. 2. The camera calibration is performed when at least one of the camera reliability level and the attitude-sensor reliability level is higher than a threshold as described above.

In step S501, the arithmetic processing device 101 determines whether the camera reliability level is greater than a threshold. When determining that the camera reliability level is greater than the threshold, the arithmetic processing device 101 moves to step S502. When determining that the camera reliability level is equal to or less than the threshold, the arithmetic processing device 101 moves to step S508. The threshold used here is identical to the threshold in step S203 of FIG. 2.

In step S502, the arithmetic processing device 101 determines whether the attitude-sensor reliability level is greater than a threshold. When determining that the attitude-sensor reliability level is greater than the threshold, the arithmetic processing device 101 executes steps S503 and S504 in parallel. When determining that the attitude-sensor reliability level is equal to or less than the threshold, the arithmetic processing device 101 moves to step S507. The threshold used here is identical to the threshold in step S207 of FIG. 2.

In step S503, the arithmetic processing device 101 performs calibration by the image information, that is, calculates the camera parameters using the images captured by the cameras 111a to 111d. This step will be described later in detail with reference to FIG. 6. Then, the arithmetic processing device 101 moves to step S505.

In step S504 executed in parallel with step S503, the arithmetic processing device 101 performs calibration by the attitude information, that is, calculates the camera parameters using the output of the gyro sensor 108. This step will be described later in detail with reference to FIG. 8.

In step S505 executed after completion of steps S503 and S504, the arithmetic processing device 101 assigns weights to the camera parameters calculated in steps S503 and S504. That is, the arithmetic processing device 101 calculates weighted average values of the camera parameters calculated based on the image information and the camera parameters calculated based on the attitude information depending on the magnitudes of the camera reliability level and the attitude-sensor reliability level, and sets the weighted average values as camera parameters. Then, the arithmetic processing device 101 moves to step S506. Upon completion of either step S503 or step S504, the arithmetic processing device 101 waits for completion of the other. While waiting for completion of the other step, the arithmetic processing device 101 calculates a distance to an obstacle or the like using the results of the completed calibration, that is, the camera parameters.

In step S506, the arithmetic processing device 101 calibrates the coordinate systems of the cameras 111a to 111d and the vehicle coordinate system. That is, the arithmetic processing device 101 calculates the attitude angles of the cameras 111a to 111d based on the camera parameters obtained in step S503, and records in the flash memory 112 the differences from the attitude angle information regarding the vehicle 1 calculated based on the output of the gyro sensor 108. Further, the arithmetic processing device 101 calculates the heights of the cameras 111a to 111d based on the camera parameters obtained in step S503, and records in the flash memory 112 the differences from the output value of the vehicle height sensor 107. The thus obtained differences in attitude angle and height indicate the relationship of the coordinate system of the image pickup unit to the vehicle coordinate system. Then, the arithmetic processing device 101 terminates the process described in the flowchart of FIG. 5.

In step S507 executed when the negative determination is made in step S502, the arithmetic processing device 101 performs the calibration by the image information as in step S503, and terminates the process described in the flowchart of FIG. 5.

In step S508, the arithmetic processing device 101 determines whether the attitude-sensor reliability level is greater than a threshold. When determining that the attitude-sensor reliability level is greater than the threshold, the arithmetic processing device 101 moves to step S509. When determining that the attitude-sensor reliability level is equal to or lower than the threshold, the arithmetic processing device 101 terminates the process described in the flowchart of FIG. 5. The threshold used here is identical to the threshold in step S207 of FIG. 2.

In step S509, the arithmetic processing device 101 performs the calibration by the attitude information as in step S504, and terminates the process described in the flowchart of FIG. 5.

(Calibration by the Image Information)

Figure 6:
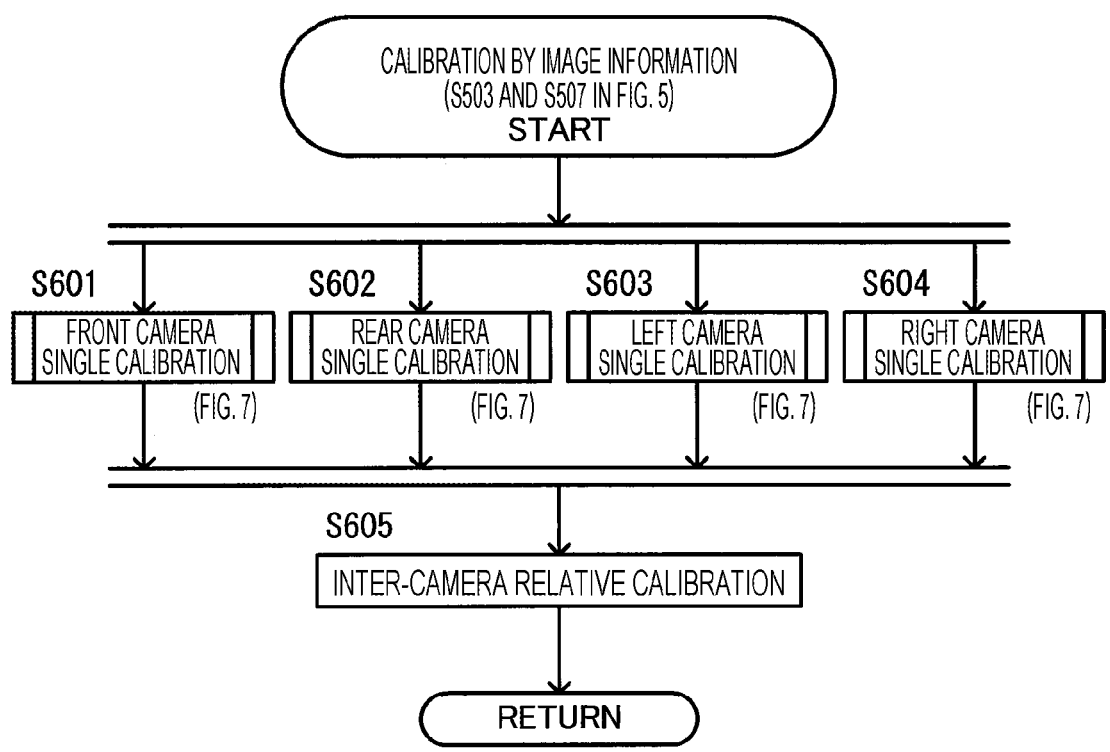
FIG. 6 is a flowchart of a calibration process based on image information.

FIG. 6 is a flowchart describing the details of the calibration by the image information, which is executed in steps S503 and S507 described in FIG. 5.

When starting the calibration by the image information, the arithmetic processing device 101 executes steps S601 to S604 in parallel. These four steps constitute single calibration for each of the cameras 111a to 111d. Steps S601 to S604 will be described later in detail with reference to FIG. 7.

Upon completion of all steps S601 to S604, the arithmetic processing device 101 then executes step S605.

In step S605, the arithmetic processing device 101 performs the inter-camera relative calibration, that is, estimates translational positions of the cameras 111a to 111d using the angles and heights of the cameras 111a to 111d with respect to the ground obtained in steps S601 to S604. The inter-camera relative calibration is a process necessary for the creation of the overhead image using the images captured by the cameras 111a to 111d. In the inter-camera relative calibration, the arithmetic processing device 101 sets one of the cameras 111a to 111d as a reference camera and estimates the transitional positions of the cameras such that, when coordinate transformation to the overhead point of view is carried out, the images partially overlap in accordance with the overlapping portions of the cameras' fields of view. For example, the arithmetic processing device 101 sets the image captured by the front camera 111a as a reference and adjusts the parameters of the rear camera 111b, the left camera 111c, and the right camera 111d such that there is no displacement of the images seen in the common image pickup area with an overlap among the fields of view. For example, the arithmetic processing device 101 uses an image of a crosswalk in an area with an overlap among the fields of view, recognizes the straight lines constituting the crosswalk, and corrects the camera translational parameters such that there is a match in the positions of the straight lines when the coordinate transformation to the overhead point of view is carried out. The correction can be implemented by the optimization method.

Then, the arithmetic processing device 101 terminates the process described in the flowchart of FIG. 6.

(Camera Single Calibration)

Figure 7:
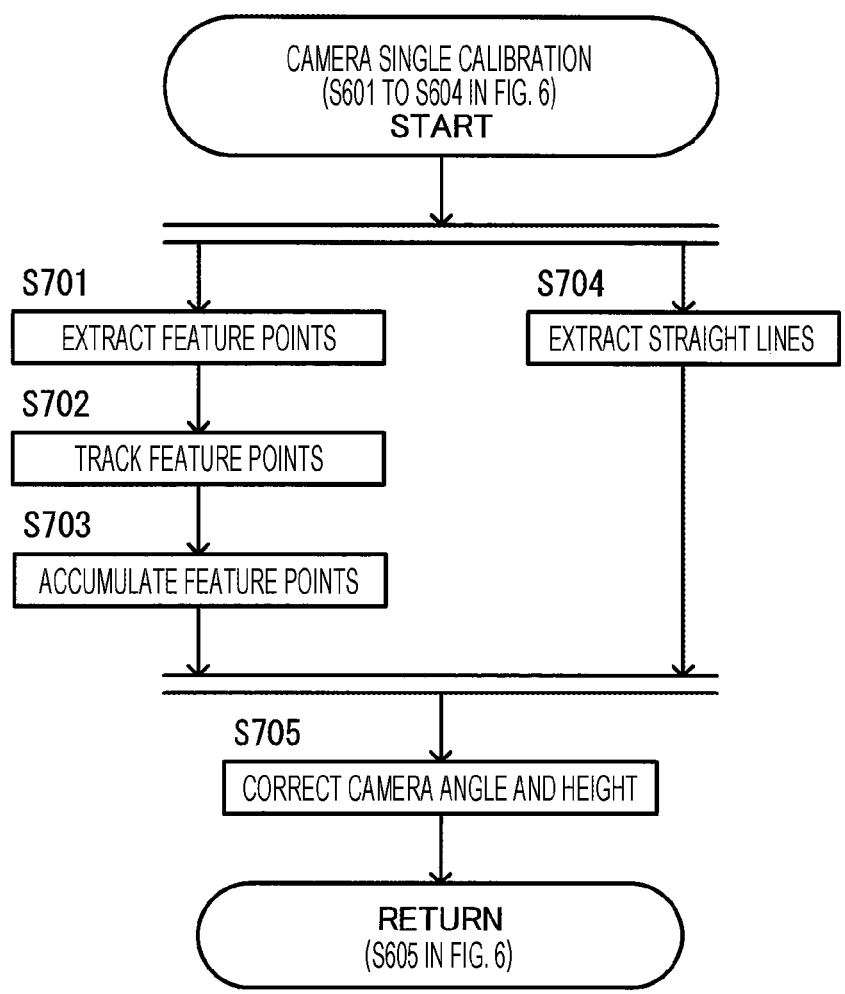
FIG. 7 is a flowchart of a camera single calibration process.

FIG. 7 is a flowchart describing the details of the camera single calibration performed in steps S601 to S604 of FIG. 6. Steps S601 to S604 are almost identical except for the cameras to be processed. Thus, step S601 on the front camera 111a will be described as a representative example. In this process, the estimation of the yaw angle and the pitch angle in step S705 is different among the cameras to be processed.

When starting the camera single calibration, the arithmetic processing device 101 executes steps S701 and S704 in parallel.

In step S701, the arithmetic processing device 101 extracts corner feature points that are unlikely to be confused with other feature points, from the image captured by the front camera 111a. The corner feature points are extracted by using a Harris corner detector, for example. Then, the arithmetic processing device 101 moves to step S702.

In step S702, the arithmetic processing device 101 tracks the feature points extracted in step S701 in the image captured by the front camera 111a at a different time. The arithmetic processing device 101 tracks the feature points, for example, by cutting out peripheral areas of the feature points extracted in step S701 and searching the next captured image for the matching areas by a method such as SSD. Then, the arithmetic processing device 101 moves to step S703.

In step S703, the arithmetic processing device 101 saves the path of the feature points tracked in step S702 in the RAM 102. The arithmetic processing device 101 repeatedly executes steps S701 to S703 until a predetermined or larger number of paths of feature points are accumulated in the RAM 102. Then, the arithmetic processing device 101 moves to step S705.

In step S704 executed in parallel with step S701, the arithmetic processing device 101 extracts straight structures along the traveling direction of the vehicle, for example, lane lines constituting the lane of the vehicle running, from the image captured by the front camera 111a. The straight structures can be extracted by a publicly known technique such as Hough transform, for example. Then, the arithmetic processing device 101 moves to step S705.

In step S705 upon completion of both steps S703 and S704, the arithmetic processing device 101 uses the feature point paths saved in step S703 and the information regarding the straight structures extracted in step S704 to make camera angle corrections, that is, estimate the angle of the front camera 111a to the ground and the height of the front camera 111a from the ground, and correct the previous calculation results. As the camera angle correction, the arithmetic processing device 101 makes three corrections, that is, pitch angle correction, yaw angle correction, and roll angle correction in order, and finally makes height estimation.

The arithmetic processing device 101 makes the pitch angle correction focusing on the feature point paths in the traveling direction of the vehicle or the parallelism of the extracted straight structures. In the image captured by the front camera 111a having undergone coordinate transformation to the overhead viewpoint, originally parallel straight lines and feature point paths along the traveling direction of the straight-traveling vehicle are supposed to look parallel to each other. With a calibration error in the pitch angle, however, these lines look inverted-V shaped, not parallel. The pitch angle can be calibrated by correcting the camera parameters such that they look parallel to each other. The angle at which the straight lines look parallel to each other in the image having undergone the coordinate transformation to the overhead viewpoint can be determined by an optimization method such as Gauss-Newton method with the parallelism of the straight lines as an objective function.

The arithmetic processing device 101 also makes the yaw angle correction under the same concept as described above. The pitch angle affects the parallelism of the straight structures in the traveling direction of the vehicle 1 as seen from the front camera 111a. The yaw angle affects the parallelism of the straight structures in the width direction of the vehicle 1 as seen from the front camera 111a. The widthwise straight structures are only crosswalks or stop lines that appear less frequently in public roads, and thus feature point paths are used. The arithmetic processing device 101 pairs two corner feature points appearing in the image at the same time and tracks their feature points. The straight line groups connecting paired feature points at the time of tracking are supposed to be parallel to each other without an error in the yaw angle. Accordingly, the arithmetic processing device 101 estimates the yaw angle parameter with which the straight line groups are parallel to each other. The estimation can be performed by an optimization method such as Gauss-Newton method with the parallelism of the straight lines as an objective function, as in the case of the pitch angle. The features used for the estimation of the pitch angle and the yaw angle are reversed between the left camera 111c and the right camera 111d.

The arithmetic processing device 101 makes the roll angle correction focusing on the feature point paths in the traveling direction of the vehicle or the extracted straight structures, as in the case of the pitch angle correction. Without an error in the roll angle, the straight structures and the straight lines formed by the feature point paths are supposed to align with the traveling direction of the vehicle 1 and align with the vertical axis direction in the overhead image, that is, the axial direction of the vehicle 1. Accordingly, the arithmetic processing device 101 corrects the roll angle such that the feature point paths in the traveling direction of the vehicle or the extracted straight structures align with the vertical axis direction in the overhead image.

The arithmetic processing device 101 makes the height correction by using the correspondence between the length of the feature point path and the traveling distance of the vehicle. That is, when the correct camera height is estimated, there is a match between the distance corresponding to the length of the feature point path and the traveling distance of the vehicle 1. However, when the estimated camera height is erroneous, there arises a difference between these distances. Accordingly, the arithmetic processing device 101 corrects the camera height such that there is a match between the distance corresponding to the length of the feature point path and the traveling distance of the vehicle 1. The traveling distance of the vehicle 1 can be obtained from the time integration of output of the vehicle speed sensor 105. The distance corresponding to the length of the feature point path can be determined from a design value. The arithmetic processing device 101 estimates the camera height by an optimization method such as Gauss-Newton method such that there is a match between the actual traveling distance determined from the vehicle speed and the length of the feature point path.

Then, the arithmetic processing device 101 terminates the process described in the flowchart of FIG. 7.

(Calibration by Attitude Information)

Figure 8:
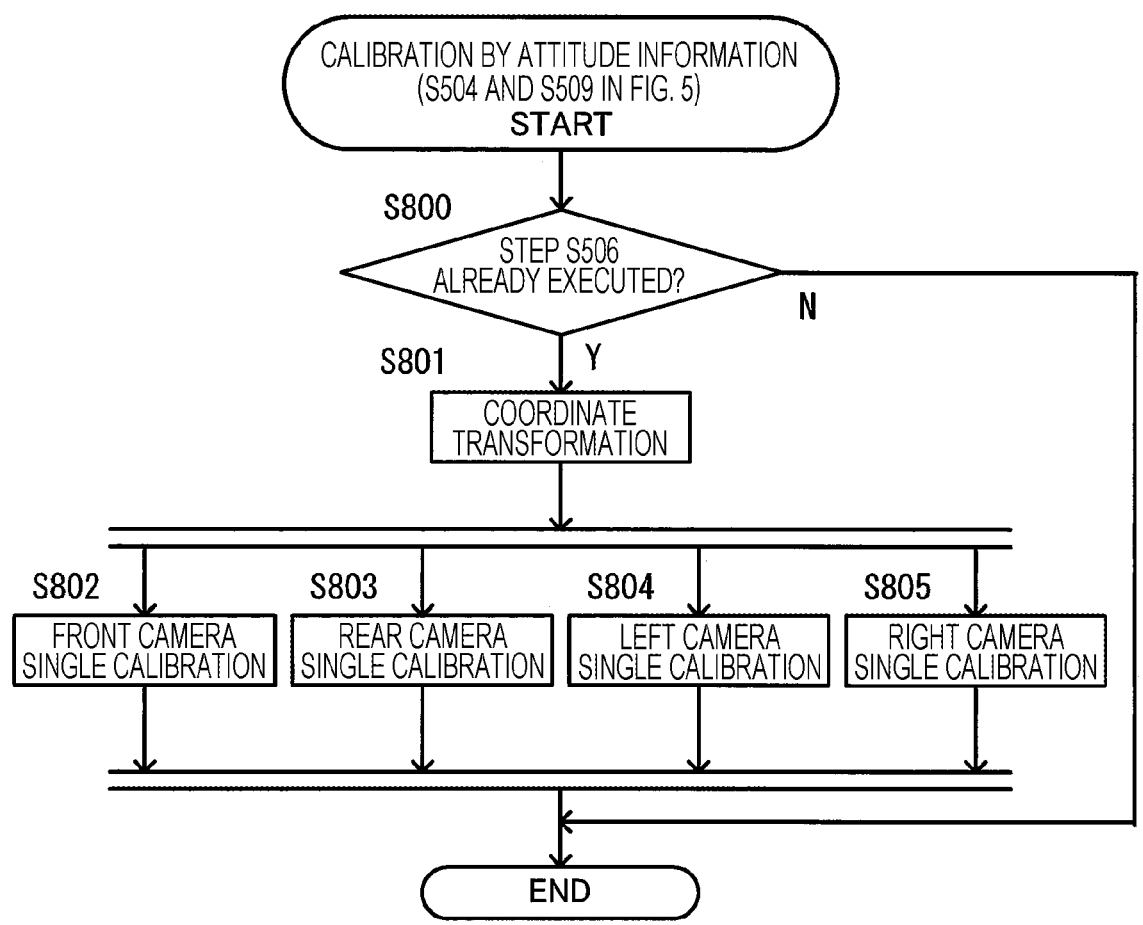
FIG. 8 is a flowchart of a calibration process based on attitude information.

FIG. 8 is a flowchart describing the details of the calibration by the attitude information, which is executed in steps S504 and S509 described in FIG. 5. The arithmetic processing device 101 performs the calibration by the attitude information based on the situation in which the cameras 111a to 111d are attached to the vehicle as a rigid body and the positions and attitudes of the cameras 111a to 111d fluctuate in conjunction with the fluctuation in the attitude of the vehicle.

In step S800, the arithmetic processing device 101 determines whether step S506 described in FIG. 5 has been already executed, that is, the calibration by the image information has been performed. In other words, the arithmetic processing device 101 determines whether the relationships of the coordinate systems of the cameras 111a to 111d to the vehicle coordinate system are known. When determining that the calibration has been performed even once, the arithmetic processing device 101 moves to step S801. When determining that no calibration has been performed, the arithmetic processing device 101 terminates the process described in the flowchart of FIG. 8. Whether step S506 described in FIG. 5 has been already executed can be determined depending on whether the flash memory 112 holds the information indicating that step S506 has been already executed, for example.

In step S801, the arithmetic processing device 101 calculates coordinate transform values of the cameras 111a to 111d using the attitude angle information regarding the vehicle coordinate system and the relationships of the coordinate systems of the cameras 111a to 111d to the vehicle coordinate system calculated in step S506 of FIG. 5. The attitude angle information regarding the vehicle coordinate system can be obtained on the basis of the output of the gyro sensor 108, the gyro correction information, and the output of the vehicle height sensor 107. Then, the arithmetic processing device 101 executes steps S802 to S805 in parallel.

In steps S802 to S805, the arithmetic processing device 101 calculates the camera parameters of the cameras 111a to 111d based on the coordinate transform values of the cameras 111a to 111d calculated in step S801. Upon completion of all steps S802 to S805, the arithmetic processing device 101 terminates the process described in the flowchart of FIG. 8.

(Setting of Attenuation Factor)

A method for setting the attenuation factor used in the calculation of the attitude-sensor reliability level in step S206 of FIG. 2 will be described. As described above, the initial value of the attenuation factor, that is, the predetermined value of the attenuation factor at the shipment from the factory is used. The arithmetic processing device 101 sets the attenuation factor based on actual measurement as described below.

When the camera calibration described in step S204 of FIG. 2 and the attitude sensor calibration in step S208 of FIG. 2 are performed at least once, the arithmetic processing device 101 performs the process below. That is, the arithmetic processing device 101 observes temporal changes in drift amount, and determines a straight line indicating a least squares approximation of a point group obtained by observing the lapse of time on a horizontal axis and the drift amount on a vertical axis. The arithmetic processing device 101 sets the inclination of the straight line as a new attenuation factor. However, the drift amount here refers to the difference between the attitude angle of the vehicle 1 calculated using the images captured by the cameras and the attitude angle of the vehicle 1 obtained by integrating the output of the gyro sensor 108.

(Example of Operations)

An example of operations of the calibration system 100 according to the embodiment will be described. As described above, the vehicle 1 has the collision avoidance function and the parking assist function. In this case, the calibration system 100 immediately after shipment from the factory is mounted in a vehicle 1*a*. That is, the calibration system 100 starts to operate in the state where the collision avoidance function and the parking assist function are not yet sufficiently performed. It is here assumed that the vehicle 1 with a plurality of occupants runs on a road to a destination, then the passenger except for the driver gets out of the vehicle 1 at the entry to a parking lot in the destination, and the driver parks the vehicle 1 in the parking lot. It is expected that the collision avoidance function is activated in the road and the parking assist function is activated in the parking lot.

(Example of Operations Until Arrival at the Destination)

First, operations of the calibration system 100 until arrival at the destination will be described.

When the driver switches on the engine, the arithmetic processing device 101 executes the process described in the main flowchart of FIG. 2. The calibration system 100 determines that the camera reliability level is greater than the threshold because the lenses of the cameras 111*a* to 111*d* have no stain on them and the captured images are of high contrast (step S203: YES). The arithmetic processing device 101 determines that the attitude-sensor reliability level is lower than the threshold because the initially set attenuation factor is high (step S207: YES). Accordingly, the arithmetic processing device 101 executes steps S208 and S204. In step S208, that is, in the process described in FIG. 4, the arithmetic processing device 101 determines that the accumulated amount of data is not sufficient (step S405: NO in FIG. 4), and thus does not execute the attitude sensor calibration in step S406. In step S204, that is, in the process described in FIG. 5, only the camera reliability level exceeds the threshold and thus the arithmetic processing device 101 executes the calibration by the image information in step S507, and executes the processes described in FIGS. 6 and 7. After that, the arithmetic processing device 101 executes again the process described in the main flowchart.

The arithmetic processing device 101 executes repeatedly step S208. When the accumulated amount of data becomes sufficient (step S405: YES in FIG. 4), the arithmetic processing device 101 then executes the attitude sensor calibration in step S406 to create the gyro correction information. The attitude-sensor reliability level characteristically takes on the maximum value immediately after the creation of the gyro correction information and then attenuates with the lapse of time. Accordingly, the arithmetic processing device 101 determines that the attitude-sensor reliability level is greater than the threshold after the creation of the gyro correction information (S207: NO in FIG. 2 and S502: YES in FIG. 5), and also executes the calibration by the attitude information in step S504. With further lapse of time, the arithmetic processing device 101 determines that the attitude-sensor reliability level has decreased and become equal to or less than the threshold. However, when the camera reliability level is greater than the threshold, the arithmetic processing device 101 executes again the attitude sensor calibration in step S208 (S203: YES and S207: YES→S208).

In this way, although the vehicle 1 was not calibrated before the shipment from the factory, the camera parameters calibration is carried out as described in FIGS. 6 and 7 while the vehicle 1 is running. Therefore, the arithmetic processing device 101 can calculate accurately the distance to an obstacle existing in the surroundings of the vehicle 1 using the images captured by the cameras 111*a* to 111*d* and perform the collision avoidance function in an effective manner. The arithmetic processing device 101 also performs the attitude sensor calibration in step S406 by the accumulated data.

(Example of Operations After Arrival at the Destination)

Next, operations of the calibration system 100 after arrival at the destination will be described.

When the vehicle 1 has arrived at the parking lot in the destination, the passenger gets out of the vehicle 1 and the driver starts to park the vehicle 1 in the parking lot. Since the passenger has got out, the total loaded weight of the vehicle 1 decreases and the loading balance changes. That is, the position and attitude of the vehicle 1 with respect to the ground change and the camera parameters of the cameras 111*a* to 111*d* need to be re-calculated.

In this case, when both the camera reliability level and the attitude-sensor reliability level are greater than the thresholds, the arithmetic processing device 101 executes both the calibration by the image information (S502 in FIG. 5) and the calibration by the attitude information (S504 in FIG. 5). However, the feature amount necessary for the calibration by the image information cannot be necessarily obtained in the parking lot, and thus the calibration by the image information may not be started immediately. In such a case, the calibration may not make it in time for the parking requiring the parking assist function.

Meanwhile, the calibration by the attitude information can be performed immediately because there is no particular problem with the acquisition of the attitude information even in the parking lot. The position and attitude of the vehicle 1 with respect to the ground change due to the passenger's getting out, but the position and attitude relationships of the cameras 111*a* to 111*d* to the vehicle coordinate system remain unchanged. This is because there is no problem in performing the calibration by the attitude information.

Accordingly, when the camera parameters need re-calculation due to the passenger's getting out in front of the parking lot, performing the calibration by the image information would take time unrealistically. However, the calibration by the attitude information can be advantageously performed in no time when the attitude-sensor reliability level is greater than the threshold even in the parking lot.

According to the first embodiment described above, the following advantages can be obtained:

(1) The calibration system 100 is mounted in the vehicle 1 and includes the gyro sensor (attitude sensor) 108 that acquires the attitude information regarding the vehicle coordinate system of the vehicle 1 and the image pickup unit 111 that captures an image of the surroundings of the vehicle 1. The calibration system 100 calculates the attitude-sensor reliability level as the reliability level of the attitude sensor 108 as described in step S206 of FIG. 2. When the calculated attitude-sensor reliability level is greater than the predetermined threshold, the calibration system 100 estimates the external parameter of the image pickup unit 111 using the angular velocity (attitude information) output by the attitude sensor and the relationship of the image pickup unit 111 to the vehicle coordinate system, as described in steps S504 and S509 of FIG. 5.

According to this configuration of the calibration system 100, the external parameter of the image pickup unit 111 can be calculated even when no image suitable for the calculation of the camera parameter can be obtained from the image pickup unit 111. That is, performing steps S504 and S509 of FIG. 5 makes it possible to calculate the camera parameter of the image pickup unit 111 even if the vehicle 1 does not run after the attitude of the vehicle 1 has changed due to a passenger's getting out or the like. Accordingly, it is possible to calculate accurately the distance using the image captured by the image pickup unit 111 even after the attitude of the vehicle 1 changes.

(2) The calibration system 100 calculates the camera reliability level as the reliability level of the image pickup unit 111 as described in step S202 of FIG. 2. When the calculated camera reliability level is greater than the predetermined threshold, the calibration system 100 estimates the external parameter of the image pickup unit using the output of the image pickup unit as described in steps S503 and S507 of FIG. 5. When the calculated attitude-sensor reliability level is greater than the predetermined threshold and the calculated camera reliability level is greater than the predetermined threshold, the calibration system 100 calculates the relationship of the image pickup unit 111 to the vehicle coordinate system based on the external parameters estimated in steps S503 and S507 of FIG. 5 and the attitude information output by the attitude sensor, as described in step S506 of FIG. 5.

Accordingly, even if no relationship of the image pickup unit 111 to the vehicle coordinate system has been calculated before shipment from the factory, the arithmetic processing device 101 can calculate the relationship of the image pickup unit 111 to the vehicle coordinate system and calculate the camera parameters in steps S504 and S509 of FIG. 5.

(3) The calibration system 100 determines whether the vehicle 1 is in the straight-traveling state or the cornering state as described in step S401 of FIG. 4, and calibrates the attitude sensor based on the output of the attitude sensor and the output of the image pickup unit 111 determined by the running state determination unit as described in step S406 of FIG. 4.

Accordingly, although the attitude angle information calculated based on the output of the gyro sensor 108 has inevitably accumulated error, the influence of the accumulated error can be eliminated by the attitude sensor calibration described in step S406 of FIG. 4.

(4) In the attitude-sensor reliability level calculation described in step S206 of FIG. 2, the attitude-sensor reliability level is calculated based on a period of time elapsed from the time when the calibration was performed by the attitude sensor correction unit.

Accordingly, it is possible to estimate easily the magnitude of the error included in the attitude angle information calculated based on the output of the gyro sensor 108.

(5) The camera reliability level calculation described in step S202 of FIG. 2 includes contrast determination for evaluating a contrast of the image captured by the image pickup unit 111 as described in step S301 of FIG. 3 and sticking object determination for evaluating a sticking object shielding an imaging plane of the image pickup unit using differences among a plurality of images captured by the image pickup unit 111 as described in step S302 of FIG. 3. The evaluations in the determination steps are used to calculate the camera reliability level.

Accordingly, it is possible to create information for determining whether the camera parameter can be calculated using the image captured by the image pickup unit 111.

Modification Example 1

In the first embodiment, the calculation of the camera parameters of the cameras 111a to 111d and the calculation of the gyro correction information of the gyro sensor 108 are not performed before shipment from the factory. Alternatively, both the camera parameters and the gyro correction information may be calculated before shipment from the factory. In this case, the calculated camera parameters and gyro correction information are stored in the flash memory 112.

According to modification example 1, it is possible to perform calibration using the attitude information immediately after shipment.

Modification Example 2

In the first embodiment, the data accumulated in steps S403 and S404 is not erased. Alternatively, the data may be erased after the lapse of a predetermined time or after step S406.

The foregoing embodiment and modification examples may be combined.

The various embodiment and modification examples have been described so far, but the present invention is not limited to them. The present invention also includes other modes conceivable within the scope of the technical idea of the present invention.

The entire disclosure of the following application on the basis of which the priority is claimed is hereby incorporated by reference herein.

Japanese patent application No. 23600 (filed on Feb. 10, 2016)

REFERENCE SIGNS LIST 1 vehicle
100 calibration system
101 arithmetic processing unit
105 vehicle speed sensor
106 steering angle sensor
107 vehicle height sensor
108 gyro sensor (attitude sensor)
111 image pickup unit
111a front camera
111b rear camera
111c left camera
111d right camera
112 flash memory

The invention claimed is:
1. A calibration system mounted in a vehicle and comprising:
an attitude sensor that acquires attitude information regarding a vehicle coordinate system of the vehicle;
a camera that captures an image of the surroundings of the vehicle; and
a processor configured to
calculate an attitude-sensor reliability level that is a reliability level of the attitude sensor,
estimate, in the case where the calculated attitude-sensor reliability level is greater than an attitude sensor reliability predetermined threshold, a first external parameter of the camera using the attitude information output by the attitude sensor and a relationship of a coordinate system of the camera to the vehicle coordinate system,
calculate, based on the attitude information, a weighted average value of the first external parameter, and
set the weighted average value as the first external parameter, wherein the first external parameter of the camera comprises at least one of a mounting position and a mounting angle of the camera with respect to the ground.

2. The calibration system according to claim 1, wherein the processor is further configured to
calculate a camera reliability level that is a reliability level of the camera;
estimate, in the case where the calculated camera reliability level is greater than a camera reliability predetermined threshold, a second external parameter of the camera using an output of the camera; and
calculate, in the case where the calculated attitude-sensor reliability level is greater than the attitude sensor reliability predetermined threshold and the calculated camera reliability level is greater than the camera reliability predetermined threshold, the relationship of the coordinate system of the camera to the vehicle coordinate system, based on the first external parameter and the second external parameter.

3. The calibration system according to claim 2, wherein the processor is further configured to
evaluate contrast of the image captured by the camera; and
use differences among a plurality of images captured by the camera at different times to evaluate a sticking object shielding an imaging plane of the camera, and
the processor calculates the camera reliability level using the evaluation of the contrast of the image captured by the camera and the evaluation of the sticking object.

4. The calibration system according to claim 2, wherein the processor is further configured to
calculate, based on the attitude information, a weighted average value of the second external parameter, and
set the weighted average value as the second external parameter.

5. The calibration system according to claim 1, wherein the processor is further configured to
determine a straight-traveling state and a cornering state of the vehicle; and
calibrate the attitude sensor based on an output of the attitude sensor and an output of the camera in the straight-traveling state and the output of the attitude sensor and the output of the camera in the cornering state.

6. The calibration system according to claim 5, wherein the processor is further configured to calculate the attitude-sensor reliability level based on a period of time elapsed from the time when the attitude sensor is calibrated.

7. The calibration system according to claim 1, wherein the processor is further configured to calculate a distance to an obstacle to avoid collision based on the first external parameter.

8. A calibration apparatus mounted in a vehicle and connected to an attitude sensor that acquires attitude information regarding a vehicle coordinate system of the vehicle and a camera that captures an image of the surroundings of the vehicle, the calibration apparatus comprising:
a processor configured to
calculate an attitude-sensor reliability level that is a reliability level of the attitude sensor,
estimate, in the case where the calculated attitude-sensor reliability level is greater than an attitude sensor reliability predetermined threshold, an external parameter of the camera using the attitude information output by the attitude sensor and a relationship of a coordinate system of the camera to the vehicle coordinate system,
calculate, based on the attitude information, a weighted average value of the first external parameter, and
set the weighted average value as the first external parameter,
wherein the external parameter of the camera comprises at least one of a mounting position and a mounting angle of the camera with respect to the ground.

9. The calibration apparatus according to claim 8, wherein the processor is further configured to
calculate a camera reliability level that is a reliability level of the camera,
estimate, in the case where the calculated camera reliability level is greater than a camera reliability predetermined threshold, a second external parameter of the camera using an output of the camera,
calculate, based on the attitude information, a weighted average value of the second external parameter,
set the weighted average value as the second external parameter, and
calculate, in the case where the calculated attitude-sensor reliability level is greater than the attitude sensor reliability predetermined threshold and the calculated camera reliability level is greater than the camera reliability predetermined threshold, the relationship of the coordinate system of the camera to the vehicle coordinate system, based on the first external parameter and the second external parameter.

* * * * *